US012724882B2

(12) United States Patent
dos Santos Silva et al.

(10) Patent No.: US 12,724,882 B2
(45) Date of Patent: Sep. 1, 2026

(54) DYNAMICALLY BLOCKING CREDENTIAL ATTACKS USING IDENTITY INTELLIGENCE

(71) Applicant: INTERNATIONAL BUSINESS MACHINES CORPORATION, Armonk, NY (US)

(72) Inventors: Bruno dos Santos Silva, Mckinney, TX (US); Cheng-Ta Lee, Chamblee, GA (US)

(73) Assignee: International Business Machines Corporation, Armonk, NY (US)

(*) Notice: Subject to any disclaimer, the term of this patent is extended or adjusted under 35 U.S.C. 154(b) by 438 days.

(21) Appl. No.: 17/706,707

(22) Filed: Mar. 29, 2022

(65) Prior Publication Data

US 2023/0315842 A1 Oct. 5, 2023

(51) Int. Cl.
*G06F 21/00* (2013.01)
*G06F 21/55* (2013.01)

(52) U.S. Cl.
CPC ...... *G06F 21/554* (2013.01); *G06F 2221/034* (2013.01)

(58) Field of Classification Search
CPC ......................... G06F 21/554; G06F 2221/034
See application file for complete search history.

(56) References Cited

U.S. PATENT DOCUMENTS

| | | | |
|---|---|---|---|
| 8,392,963 B2 | 3/2013 | Shulman | |
| 11,356,472 B1 * | 6/2022 | Maiorana | H04L 63/107 |
| 2005/0216955 A1 | 9/2005 | Wilkins | |
| 2015/0033322 A1 | 1/2015 | Wang | |
| 2015/0304345 A1 | 10/2015 | Muller | |
| 2017/0093910 A1 * | 3/2017 | Gukal | H04L 63/1416 |
| 2020/0137109 A1 * | 4/2020 | Endler | H04L 63/1425 |
| 2021/0243207 A1 * | 8/2021 | Crume | G06F 16/2255 |
| 2022/0239673 A1 * | 7/2022 | Kfir | G06F 16/2365 |
| 2023/0021423 A1 * | 1/2023 | DeVico | G06F 16/9536 |

OTHER PUBLICATIONS

"Who is the OWASP® Foundation?" OWASP Foundation, Open Source Foundation for Application Security, 2 pps., Copyright 2022, <https://owasp.org/#>.

(Continued)

*Primary Examiner* — Jeffrey C Pwu
*Assistant Examiner* — Helai Salehi
(74) *Attorney, Agent, or Firm* — Caleb D. Wilkes

(57) ABSTRACT

A computer-implemented apparatus and related method prevent credential attacks. The method receives authentication transactions (ATs) comprising AT features (ATFs). The method then performs clustering, to produce clustered ATFs (CATFs) from the ATFs utilizing rule-based clustering. The clustering may operate by assigning user credentials: 1) from a same source IP to a common CATF; 2) targeting a same username to a common CATF; and/or with a same password to a common CATF. Upon determining a CATF is malicious, the method may classify the CATFs as malicious, and otherwise, classify the CATF as non-malicious. The method may further block an activity using a feature included in a malicious CATF.

19 Claims, 6 Drawing Sheets

(56) References Cited

OTHER PUBLICATIONS

Caron et al., "Deep Clustering for Unsupervised Learning of Visual Features", (2019), Facebook AI Research, 30 pps., <https://arxiv.org/abs/1807.05520>.
Girish et al., "Unsupervised clustering based understanding of CNN", CVPR Workshops (2019), 3 pps., <http://openaccess.thecvf.com/content_CVPRW_2019/papers/Explainable%20AI/Girish_Unsupervised_clustering_based_understanding_of_CNN_CVPRW_2019_paper.pdf>.
Mirante et al., "Understanding password database compromises", Dept. of Computer Science and Engineering, Polytechnic Inst. of NYU, Tech. Rep., TR-CSE-2013-02 (2013), 25 pps., <https://ssl.engineering.nyu.edu/papers/tr-cse-2013-02.pdf>.
Newman, "Cybercrime, identity theft, and fraud: practicing safe internet—network security threats and vulnerabilities", 2006, In Proceedings of the 3rd annual conference on Information security curriculum development (InfoSecCD '06), Association for Computing Machinery, New York, NY, USA, 68-78, <https://doi.org/10.1145/1231047.1231064>.
Omolara et al., "A prototype for ensuring patient's information privacy and thwarting electronic health record threats based on decoys", Health Informatics Journal, Sep. 2020, vol. 26(3), 2083-2104, doi:10.1177/1460458219894479.
Mell et al., "The NIST Definition of Cloud Computing", National Institute of Standards and Technology, U.S. Department of Commerce, NIST Special Publication 800-145, Sep. 2011, 7 pages.
"Convolutional Neural Network", Wikipedia, 16 pps., last edited on Mar. 5, 2022, <https://en.wikipedia.org/wiki/Convolutional_neural_network>.

* cited by examiner

208
AUTHENTICATION DATA (FROM SERVICES 210)
310
AT COLLECTING
320
DATA PARSING
330
APPLYING RULES ENGINE
230
CLUSTERS

DYNAMICALLY BLOCKING CREDENTIAL ATTACKS USING IDENTITY INTELLIGENCE

BACKGROUND

Disclosed herein is a system and related method for dynamically blocking credential attacks using identity intelligence. In particular, the use of clustering techniques are utilized to determine malicious clusters, and features associated with the malicious clusters may then be used to block the credential attacks.

SUMMARY

A computer-implemented method is provided for preventing credential attacks. The method receives authentication transactions (ATs) comprising AT features (ATFs). The method then performs clustering, to produce clustered ATFs (CATFs) from the ATFs utilizing rule-based clustering. The clustering may operate by assigning user credentials: 1) from a same source IP to a common CATF; 2) targeting a same username to a common CATF; and/or with a same password to a common CATF. Upon determining a CATF is malicious, the method may classify the CATFs as malicious, and otherwise, classify the CATF as non-malicious. The method may further block an activity using a feature included in a malicious CATF.

An apparatus is also provided for preventing credential attacks, comprising a memory, and a processor. The processor is configured to receive authentication transactions (ATs) comprising AT features (ATFs). It is further configured to cluster, to produce clustered ATFs (CATFs) from the ATFs utilizing rule-based clustering. The clustering comprises assigning user credentials from a same source IP to a common CATF, assigning user credentials targeting a same username to a common CATF, and assigning user credentials with a same password to a common CATF. Upon a determination that a first CATF is malicious, the processor classifies the first CATFs as malicious. Upon a determination that a second CATF is non-malicious, the processor classifies the second CATF as non-malicious. The processor further blocks an activity using a feature included in a malicious CATF.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

The following general acronyms may be used below:

TABLE 1

| General Acronyms | |
|---|---|
| API | application program interface |
| ARM | advanced RISC machine |
| CD-ROM | compact disc ROM |
| CMS | content management system |
| CoD | capacity on demand |
| CPU | central processing unit |
| CUoD | capacity upgrade on demand |
| DPS | data processing system |
| DVD | digital versatile disk |
| EVC | expiring virtual currency (a virtual currency having an expiration date, or subject to other virtual currency usage rules; local virtual currencies with expiration dates) |
| EVCU | expiring virtual currency (units) |
| EPROM | erasable programmable read-only memory |
| FPGA | field-programmable gate arrays |
| HA | high availability |
| HTML | hypertext markup language |
| IaaS | infrastructure as a service |
| I/O | input/output |
| IPL | initial program load |
| ISP | Internet service provider |
| ISA | instruction-set-architecture |
| LAN | local-area network |
| LPAR | logical partition |
| PaaS | platform as a service |
| PDA | personal digital assistant |
| PLA | programmable logic arrays |
| RAM | random access memory |
| RISC | reduced instruction set computer |
| ROM | read-only memory |
| SaaS | software as a service |
| SLA | service level agreement |
| SRAM | static random-access memory |
| VCUR | virtual currency usage rules |
| WAN | wide-area network |

Data Processing System in General

Figure 1A:
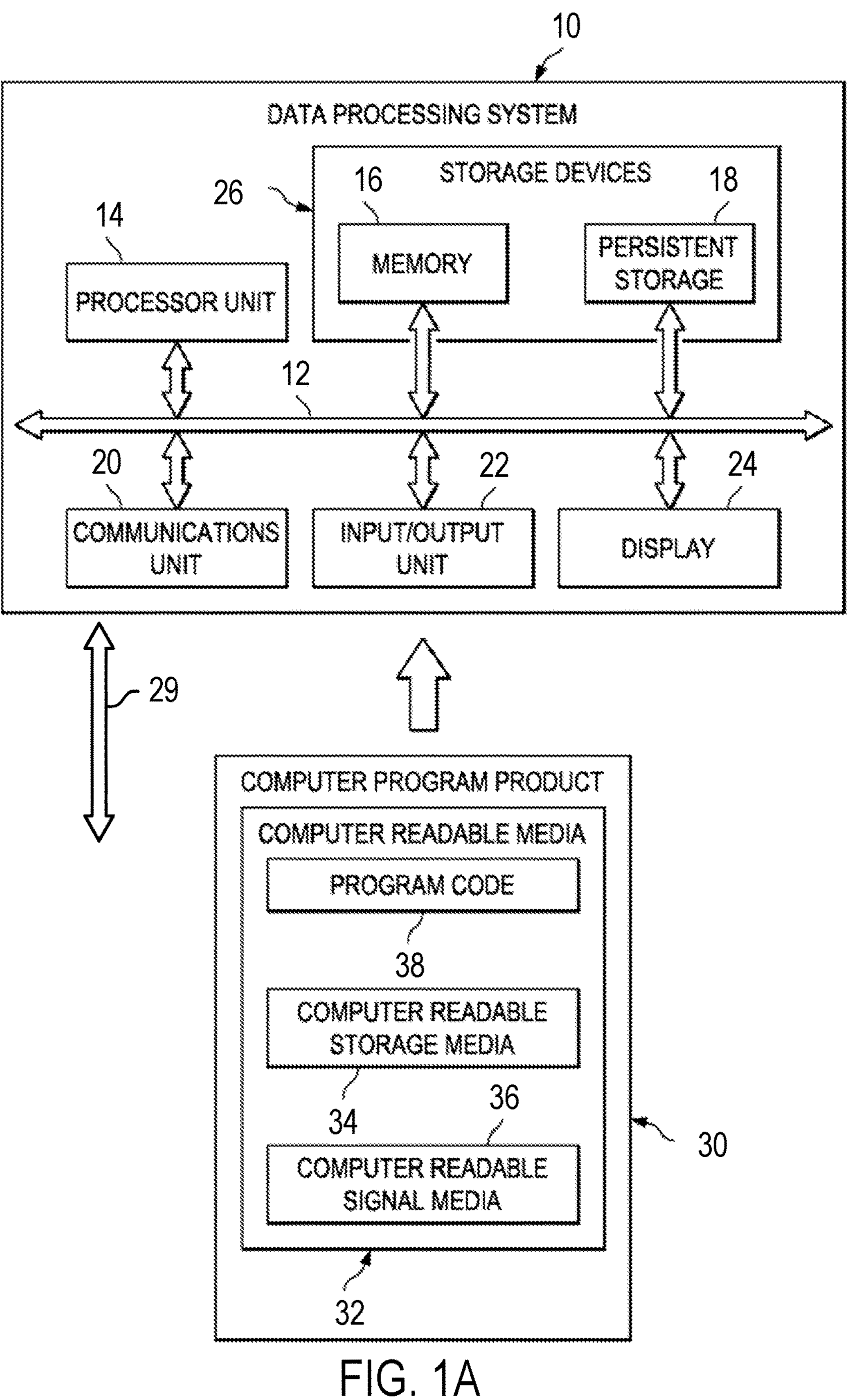
FIG. 1A is a block diagram of a data processing system (DPS) according to one or more embodiments disclosed herein.

FIG. 1A is a block diagram of an example DPS according to one or more embodiments. In this illustrative example, the DPS 10 may include communications bus 12, which may provide communications between a processor unit 14, a memory 16, persistent storage 18, a communications unit 20, an I/O unit 22, and a display 24.

The processor unit 14 serves to execute instructions for software that may be loaded into the memory 16. The processor unit 14 may be a number of processors, a multi-core processor, or some other type of processor, depending on the particular implementation. A number, as used herein with reference to an item, means one or more items. Further, the processor unit 14 may be implemented using a number of heterogeneous processor systems in which a main processor is present with secondary processors on a single chip. As another illustrative example, the processor unit 14 may be a symmetric multi-processor system containing multiple processors of the same type.

The memory 16 and persistent storage 18 are examples of storage devices 26. A storage device may be any piece of hardware that is capable of storing information, such as, for example without limitation, data, program code in functional form, and/or other suitable information either on a temporary basis and/or a permanent basis. The memory 16, in these examples, may be, for example, a random access memory or any other suitable volatile or non-volatile storage device. The persistent storage 18 may take various forms depending on the particular implementation.

For example, the persistent storage 18 may contain one or more components or devices. For example, the persistent storage 18 may be a hard drive, a flash memory, a rewritable optical disk, a rewritable magnetic tape, or some combination of the above. The media used by the persistent storage 18 also may be removable. For example, a removable hard drive may be used for the persistent storage 18.

The communications unit 20 in these examples may provide for communications with other DPSs or devices. In these examples, the communications unit 20 is a network interface card. The communications unit 20 may provide communications through the use of either or both physical and wireless communications links.

The input/output unit 22 may allow for input and output of data with other devices that may be connected to the DPS 10. For example, the input/output unit 22 may provide a connection for user input through a keyboard, a mouse, and/or some other suitable input device. Further, the input/output unit 22 may send output to a printer. The display 24 may provide a mechanism to display information to a user.

Instructions for the operating system, applications and/or programs may be located in the storage devices 26, which are in communication with the processor unit 14 through the communications bus 12. In these illustrative examples, the instructions are in a functional form on the persistent storage 18. These instructions may be loaded into the memory 16 for execution by the processor unit 14. The processes of the different embodiments may be performed by the processor unit 14 using computer implemented instructions, which may be located in a memory, such as the memory 16. These instructions are referred to as program code 38 (described below) computer usable program code, or computer readable program code that may be read and executed by a processor in the processor unit 14. The program code in the different embodiments may be embodied on different physical or tangible computer readable media, such as the memory 16 or the persistent storage 18.

The DPS 10 may further comprise an interface for a network 29. The interface may include hardware, drivers, software, and the like to allow communications over wired and wireless networks 29 and may implement any number of communication protocols, including those, for example, at various levels of the Open Systems Interconnection (OSI) seven layer model.

FIG. 1A further illustrates a computer program product 30 that may contain the program code 38. The program code 38 may be located in a functional form on the computer readable media 32 that is selectively removable and may be loaded onto or transferred to the DPS 10 for execution by the processor unit 14. The program code 38 and computer readable media 32 may form a computer program product 30 in these examples. In one example, the computer readable media 32 may be computer readable storage media 34 or computer readable signal media 36. Computer readable storage media 34 may include, for example, an optical or magnetic disk that is inserted or placed into a drive or other device that is part of the persistent storage 18 for transfer onto a storage device, such as a hard drive, that is part of the persistent storage 18. The computer readable storage media 34 also may take the form of a persistent storage, such as a hard drive, a thumb drive, or a flash memory, that is connected to the DPS 10. In some instances, the computer readable storage media 34 may not be removable from the DPS 10.

Alternatively, the program code 38 may be transferred to the DPS 10 using the computer readable signal media 36. The computer readable signal media 36 may be, for example, a propagated data signal containing the program code 38. For example, the computer readable signal media 36 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 38 may be downloaded over a network to the persistent storage 18 from another device or DPS through the computer readable signal media 36 for use within the DPS 10. For instance, program code stored in a computer readable storage medium in a server DPS may be downloaded over a network from the server to the DPS 10. The DPS providing the program code 38 may be a server computer, a client computer, or some other device capable of storing and transmitting the program code 38.

The different components illustrated for the DPS 10 are not meant to provide architectural limitations to the manner in which different embodiments may be implemented. The different illustrative embodiments may be implemented in a DPS including components in addition to or in place of those illustrated for the DPS 10.

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1B:
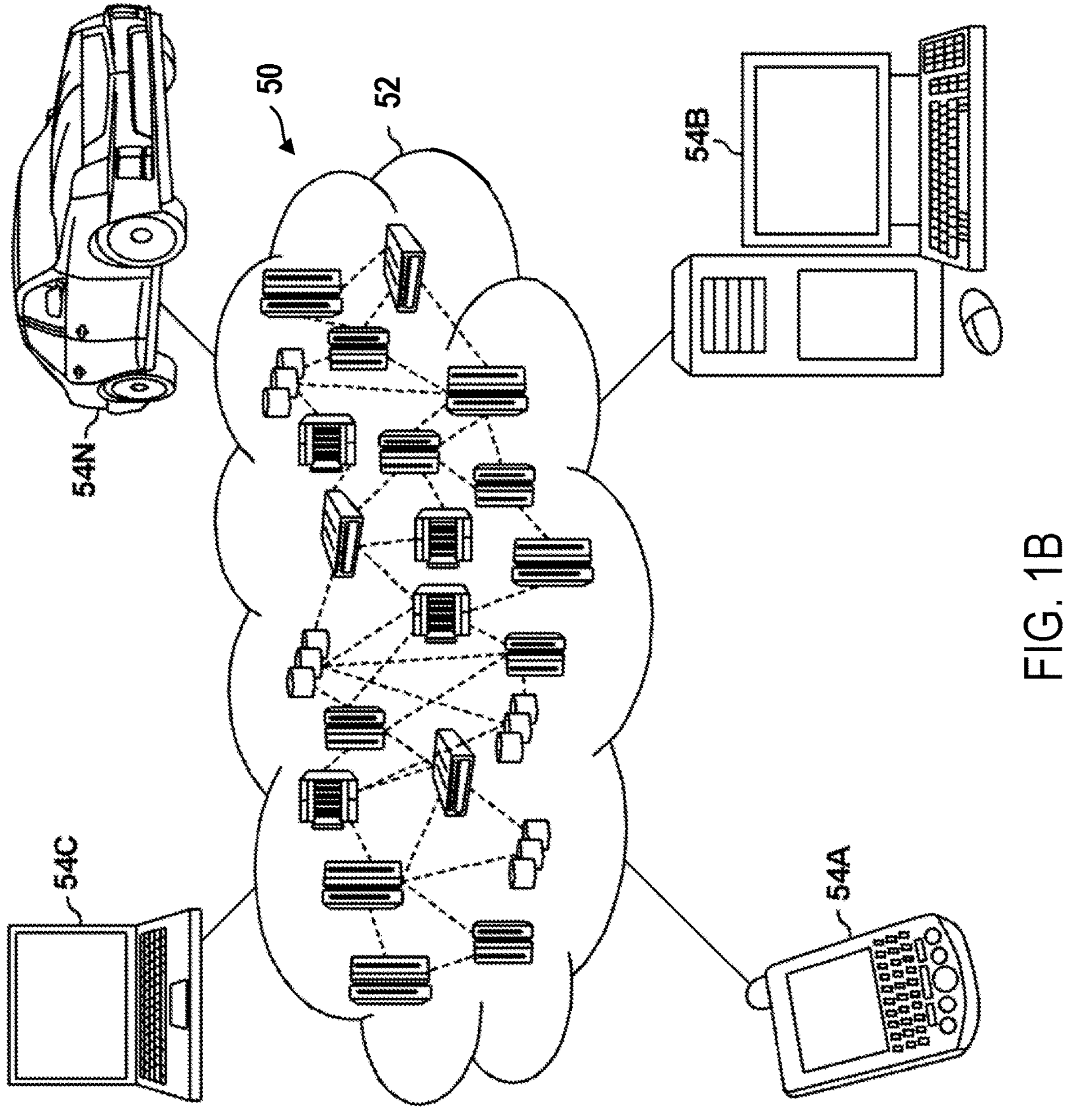
FIG. 1B is a pictorial diagram that depicts a cloud computing environment according to an embodiment disclosed herein.

Referring now to FIG. 1B, illustrative cloud computing environment 52 is depicted. As shown, cloud computing environment 52 includes one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 1B are intended to be illustrative only and that computing nodes 50 and cloud computing environment 52 can communicate with any type of computerized device over any type of network and/or network addressable connection (e.g., using a web browser).

Figure 1C:
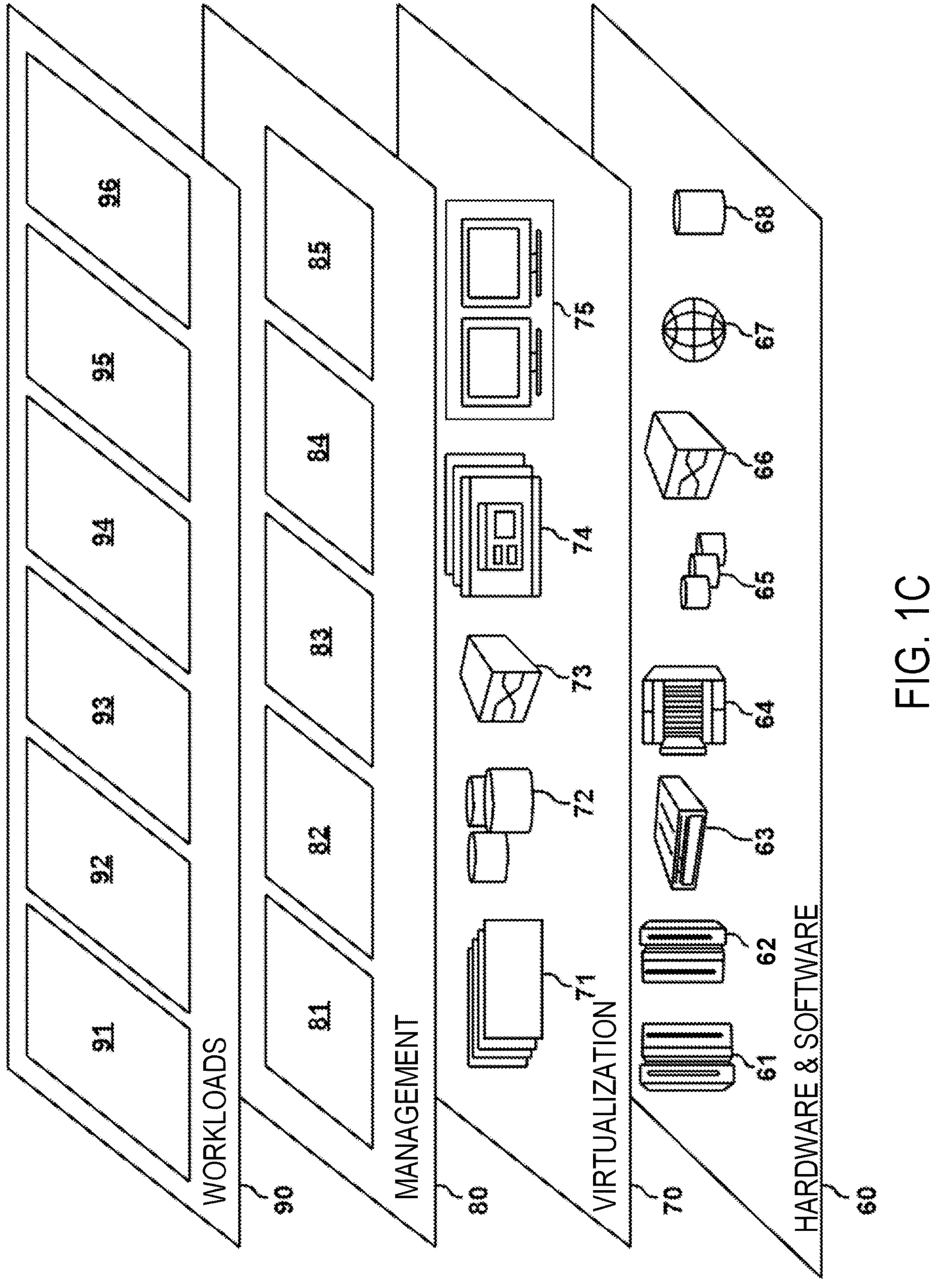
FIG. 1C is a pictorial diagram that depicts abstraction model layers according to an embodiment disclosed herein.

Referring now to FIG. 1C, a set of functional abstraction layers provided by cloud computing environment 52 (FIG. 1B) is shown. It should be understood in advance that the components, layers, and functions shown in FIG. 1C are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application processing elements 96.

Any of the nodes 50 in the computing environment 52 as well as the computing devices 54A-N may be a DPS 10.

Computer Readable Media

The present invention may be a system, a method, and/or a computer readable media at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention are presented for purposes of illustration, but are not intended to be exhaustive or limited to the embodiments disclosed. Many modifications and variations will be apparent to those of ordinary skill in the art without departing from the scope and spirit of the described embodiments. The terminology used herein has been chosen to best explain the principles of the embodiments, the practical application or technical improvement over technologies found in the marketplace, or to enable others of ordinary skill in the art to understand the embodiments disclosed herein.

Dynamically Blocking Credential Attacks Using Identity Intelligence

The following application-specific acronyms may be used below:

TABLE 2

| Application-Specific Acronyms | |
|---|---|
| AI | artificial intelligence |
| ANN | artificial neural network |
| ASN | automatic system lookup |
| AT | authentication transaction |
| ATF | authentication transaction feature |
| ATS | authentication transaction system |
| CATF | clustered authentication transaction feature |
| CNN | convolutional neural network |
| HTTP | hypertext transfer protocol |
| ML | machine learning |
| IP | Internet Protocol |
| IPS | intrusion prevention system |
| JSON | JavaScript Object Notation |
| OWASP | Open Web Application Security Project ® |
| ReLU | rectified linear unit |
| SIANN | shift/space invariant artificial neural network |
| SIEM | security and information event management |
| TADS | traditional anomaly detection system |
| TI | threat intel |
| TTP | tactics, techniques, and procedure |
| XML | extensible markup language |

Customers from various markets, such as telecommunications, banking, and others, have widely embraced a digital transformation over the years. As the consumer basis for online services has increased and evolved, so have attacks created to exploit them. One of the most famous categories of attacks is what the Open Web Application Security Project® (OWASP) calls "brute force attacks". In these brute force attacks, an attacker attempts to break into systems by executing a large number of authentication requests with a large database of username/password pairs.

Within this category of attacks, there is a specific trending attack called "credential stuffing" that comprises a large amount of data leakage. OWASP defines this type of attack as:

> The automated injection of breached username/password pairs in order to fraudulently gain access to user accounts. This is a subset of the brute force attack category: large numbers of spilled credentials are automatically entered into websites until they are potentially matched to an existing account, which the attacker can then hijack for their own purposes".

It has become very common to see credential stuffing attacks on public services requiring authentication, given that users need to login first to see personal information stored on the website.

Tools such as rule-based engines are useful to detect anomalies in user authentications. However, such tools either suffer from a high rate of false-positives or low sensitivity and these tools are not often effective in blocking malicious login attempts. Moreover, a rule-based engine does not learn from the past, nor can it explain the attack or link it to a probable campaign.

A login failure does not constitute a single event, and it is important to understand what is behind a login failure to prioritize a response for possible threats. For example, if a threat actor drives a series of login failures, these activities are a good indicator of a targeted attack. If the attacker is a minor player, such as a script kid using rainbow tables to conduct the attack, this is less critical to security administration. Additionally, the whole attack could be a consequence of a new data leakage that enterprises may not yet be aware of, causing a series of zero-day credential attacks.

Existing solutions for detecting credential stuffing do not: 1) learn from historical data and provide meaningful and actionable intel to prevent future attacks; and 2) contextualize attacks. This failure to contextualize credential stuffing is because: a) it is not known if attacks from different IP addresses are related; b) it is not known if threat actors will continue the attack; c) it is not known what drives the attacks (e.g., the root cause could be data leakage); and d) it is not known if attacks were driven by the same data leakage. Knowing the context of the credential stuffing can help security administrators to understand the business impact of each data leakage incident.

Disclosed herein is a system and related methods that combines rule-based systems and clustering algorithms to address current gaps by contextualizing attacks or by simply clustering features that may be relevant to assist in responding to a particular credential stuffing campaign.

One of the biggest challenges of classifying information is finding sources of ground truth to label information without having to refrain back to machine-learning algorithms. Events and flow data, when parsed and correlated by security and information event management (STEM) technology or data-lake type of technology, generate a reliable source of ground truth for labeled authentication events and flows. For instance, a Microsoft Windows® machine will generate authentication successful events when a user logs into a machine, or an identity and access management tool will generate an authentication successful event when it logs on to a single sign-on based system. Such events have known, parsed, correlated event data, and generate a well-known, classified flow data from a source to a destination. Such data provides the following features that may be applied to the disclosed method using a data parser: 1) timestamp; 2) time interval; 3) username; 4) password hash; 5) plaintext password; 6) semantic of password; 7) source IP address; 8) destination IP address; 9) IP reputation: automatic system lookup (ASN), Geo, and categories; and 10) timeseries data, which may include: 10(a) # of login attempts per min; and 10(b) a pattern in login attempts. This information may form a part of "authentication transactions" related to events associated with accessing computer-based resources via, e.g., a username, password, authorizing token, and the like. Authentication logs are files that log authentication transactions, possibly along with other information.

According to some embodiments, a solution clusters the different authentication features described above into similar groups (peer grouping). This may be accomplished by running clustering algorithms on the features extracted from authentication data (log or flows) to create multiple groups.

The clustering system may run in parallel with a traditional anomaly detection system (TADS). The clustering system may create various clusters without determining the maliciousness or malicious nature of a particular cluster. The TADS detects possible new malicious/suspicious transactions through tactics, techniques, and procedures (TTPs), threat intel (TI), or other known mechanisms. The TADS then starts labeling the clusters created by the clustering system. The labeled clusters bring additional insights to the TADS to increase the accuracy and speed up the response time because it observes similar patterns through authentication events. For example, when the TADS labels a new malicious cluster, all of the authentication transactions that result in successful logins (implying an imposter has accessed a correct username/password pair) should be investigated.

Figure 2:
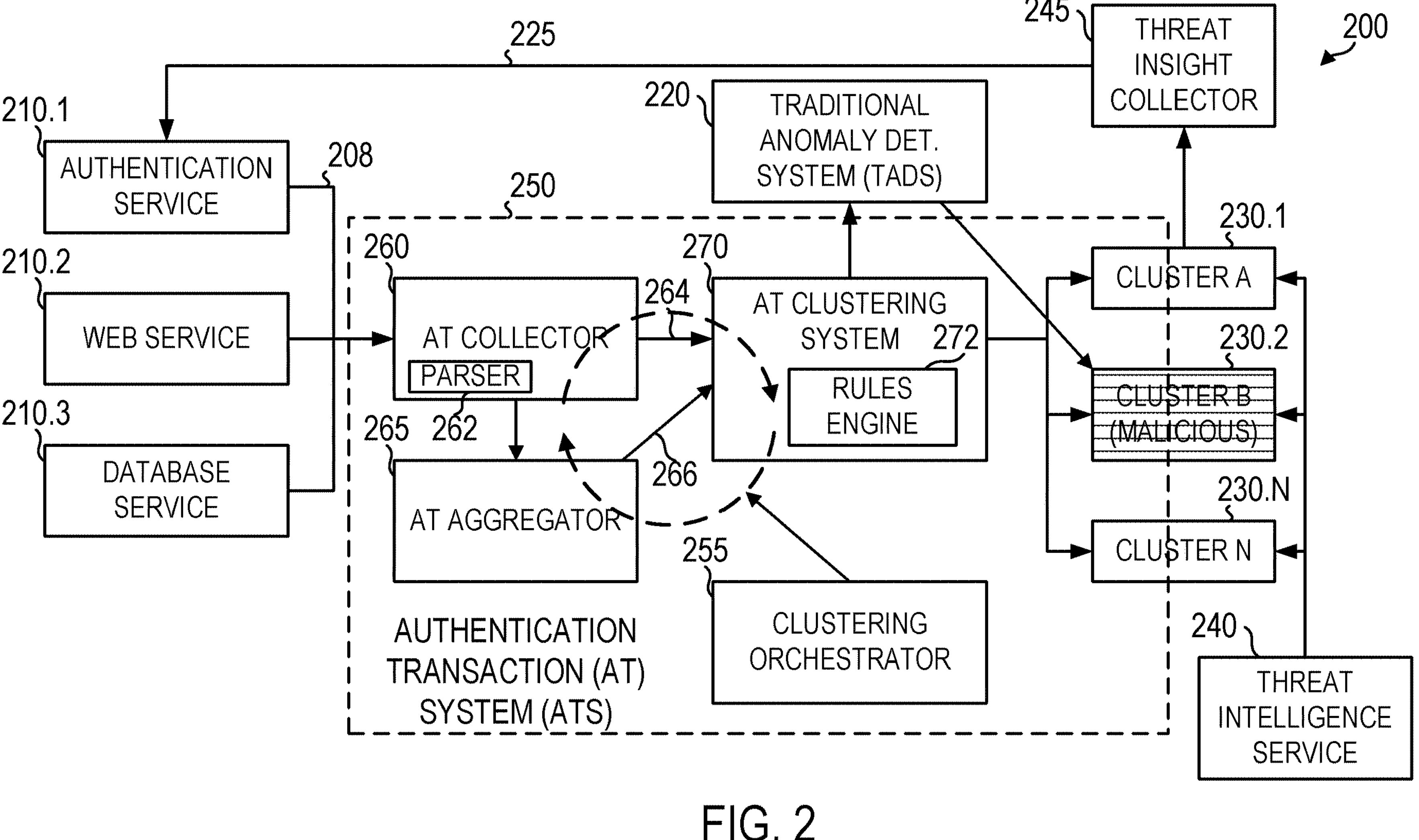
FIG. 2 is a block diagram that illustrates an environment in which an authentication transaction system operates, according to some embodiments.

FIG. 2 is a block diagram that illustrates an environment 200 in which the novel authentication transaction (AT) system (ATS) 250 operates. The various components described below may be implemented on one or more DPSs 10, described above, and may be implemented within the context of a cloud computing environment 52. The functionality of the various components described below may constitute portions of the application processing elements 96.

The ATS 250 may advantageously allow learning from the past. For example, if an attacker uses the same user credential that is found in a known malicious cluster, the user access using that user credential may be blocked directly, and the source IP containing the user credential might be related to the other attacks in the same cluster. A related analysis also may help identify a data leakage. For example, if a group of unique credentials are being used in multiple attacks, this is a strong indicator of data leakage. Moreover, it is also possible to tell if the attack is driven by the same data leakage.

The ATS 250 also may assist in understanding how attackers conducted the attack, and may lead to some TTPs used by certain threat groups. For example, it may be possible to determine if an attack targeted a specific user, and what kind of brute force technique was used (e.g., a rainbow table in which a password cracking method uses a special table (a "rainbow table") to crack the password hashes in a database, or a data leakage in which information from a compromised system was stolen).

The ATS 250 may also use AI/ML to help identify similar or related attacks using cluster authentication logs based on unknown relationships (relationships that human analysis missed, i.e., manually unrecognized relations). For example, there might be a pattern in a list of usernames that the attackers used, or a pattern in the password they generated (e.g., some users change the last character in their password every three months to comply with a security policy). In some embodiments, convolutional neural networks (CNN) may be used for the clustering.

The name "convolutional neural network" indicates that the CNN employs a convolution mathematical operation. Convolutional networks are a specialized type of neural networks that use convolution in place of general matrix multiplication in at least one of their layers. In deep learning, a convolutional neural network (CNN, or ConvNet) is a class of Artificial Neural Network (ANN). A CNN is also known as Shift Invariant or Space Invariant Artificial Neural Networks (SIANN), based on the shared-weight architecture of the convolution kernels or filters that slide along input features and provide translation equivariant responses known as feature maps. Most convolutional neural networks are only equivariant, as opposed to invariant, to translation.

CNNs are regularized versions of multilayer perceptrons. Multilayer perceptrons usually mean fully connected networks, that is, each neuron in one layer is connected to all neurons in the next layer. The "full connectivity" of these networks make them prone to overfitting data. Typical ways of regularization, or preventing overfitting, include: penalizing parameters during training (such as weight decay) or trimming connectivity (skipped connections, dropout, etc.). CNNs take a different approach towards regularization: they take advantage of the hierarchical pattern in data and assemble patterns of increasing complexity using smaller and simpler patterns embossed in their filters. Therefore, on a scale of connectivity and complexity, CNNs are on the lower extreme. CNNs use relatively little pre-processing compared to some other classification algorithms. This means that the network learns to optimize the filters (or kernels) through automated learning, whereas in traditional algorithms these filters are hand-engineered. This independence from prior knowledge and human intervention in feature extraction may be advantageous.

A CNN comprises an input layer, hidden layers and an output layer. In any feed-forward neural network, any middle layers are called hidden because their inputs and outputs are masked by the activation function and final convolution. In a CNN, the hidden layers include layers that perform convolutions. This may include a layer that performs a dot product of the convolution kernel with the layer's input matrix. This product is usually the Frobenius inner product, and its activation function is commonly a rectified linear unit (ReLU). As the convolution kernel slides along the input matrix for the layer, the convolution operation generates a feature map, which in turn contributes to the input of the next layer. This is followed by other layers such as pooling layers, Convolutional layers convolve the input and pass its result to the next layer. Each convolutional neuron processes data only for its receptive field. Although fully connected feed-forward neural networks can be used to learn features and classify data, this architecture is generally impractical for larger inputs. Instead, convolution reduces the number of free parameters, allowing the network to be deeper. Using regularized weights over fewer parameters avoids the vanishing gradients and exploding gradients problems seen during backpropagation in traditional neural networks.

Such CNNs may be applied to the classification of authentication log sequences as inputs, using rule-based grouping to group authentication logs (e.g., the logs from the same source IP or according to some other authentication transaction attribute) and then use a CNN to classify them. This may help to identify unknown relationships. Use of a CNN can provide a relatively good performance for unsupervised clustering, in some embodiments. In other embodiments, supervised learning (using pre-labeled data of a training set), or partially-supervised learning may be applied as well.

Finally, the ATS 250 may help gathering and developing new insights about techniques that attackers use. For example, if the same password was used in a different account, it is unlikely to be an attack rooted in a data leakage because the attacker usually retrieves both a username and a password in most of the data leakage situations.

Various entities external to the clustering system 250 are shown, including a number of services: an authentication service 210.1, a web service 210.2, and a database service 210.3 (the services or other sources of authentication data may be collectively or representatively referred to herein by the reference no. 210, and the invention is not limited to only the services or authentication data sources illustrated in FIG. 2). The authentication service 210.1 may be, e.g., a mechanism, analogous to the use of passwords on time-sharing systems, for the secure authentication of the identity of network clients by servers and vice versa, without presuming the operating system integrity of either (e.g., Kerberos). The web service 210.2 may be, e.g., a service offered by an electronic device to another electronic device, communicating with each other via the World Wide Web, or a server running on a computer device, listening for requests at a particular port over a network, serving web documents (HTML, JSON, XML, images). In a web service, a web technology, such as HTTP, may be used for transferring machine-readable file formats such as XML and JSON. In practice, a web service commonly provides an object-oriented web-based interface to a database server, utilized for example by another web server, or by a mobile app, that provides a user interface to the end-user. The database service 210.3 may ensure that customer databases are protected and monitored by establishing backup and recovery procedures, providing a secure database environment, and monitoring database performance. The environment 200 may also comprise a traditional anomaly detection system (TADS) 220, which the clustering system 250 may augment and/or be augmented by.

Information from the services 210, such as authorization logs 208 and/or authentication transactions are provided as an input to the ATS 250. In particular, this information may be in the form of the authentication logs 208 that are provided to an AT collector 260, which collects and normalizes the authentication logs 208 from these related services 210. The AT collector 260 provides an initial classification for everything that belongs to an authentication event, such as authentication successes, authentication failures, etc., and provides a centralized place where AT features (ATFs) can be extracted to be used for clustering, i.e., to produce clustered ATFs (CATFs). The AT collector 260 may also perform ATF extraction to feed predefined ATF sets to other systems. A parser 262 may be used to parse the ATs to identify and optionally label the components, attributes, and/or features of the ATs.

An AT aggregator 265 receives the authentication logs 208 and aggregates them (or, more precisely, the authentication transactions and their features) together to preserve the full context in which they were captured (e.g., by producing additional context information), and may preserve features and/or relationships between authentication transactions that the TADS 220 does not consider. By way of example, a hacker may have a predefined list of username-password pairs that they try on all target computers. If ATs originating from different IP addresses use the same predefined list, it may not be apparent to the TADS 220 that this attack has a common origin. But by considering the relationships of the AT, given a common sequencing of certain username-password pairs, a relationship between the ATs may be established, and a common source of the attack may be recognized.

The TADS 220 links, correlates, and analyzes the transaction logs 208 to identify anomalies. The output of the TADS 220 and the ATS 250 may be applied to label clusters—cluster A 230.1, cluster B 230.2, through cluster N 230.N (which may be referred to herein collectively or representatively by reference no. 230)—these CATFs being created by the AT clustering system 270. As shown in FIG. 2, the TADS 220 may, in some embodiments, create and update only malicious CATFs, such as malicious cluster B 230.2, whereas the AT clustering system 270 may create and update all of the clusters 230 whether they are malicious clusters or not. To delineate malicious clusters 230.2 from non-malicious (or benign) clusters 230.1, 230.N, any known form can be used, such as setting a "malicious cluster" flag upon determining the cluster is malicious, and clearing it or leaving it blank upon determining the cluster is not malicious.

The AT clustering system 270 may receive input from either or both of the AT collector 260 and AT aggregator 265 (the latter being used to group the ATs). The AT collector 260 may provide single-point AT transaction data 264 to the AT clustering system 270. This single-point data may be useful to process prospective threats in real-time with rapid processing. The AT aggregator 265 may provide aggregated AT transaction data 266 to the AT clustering system 270 in which aggregated data may provide an advantage in how the data is processed. In different embodiments, various supervised, partially-supervised, and unsupervised clustering algorithms may be applied at this point. The AT clustering system 270 may, in some embodiments, integrate multiple clustering algorithms. For example, a rules engine 272 that implements a rule-based clustering may group ATs by source IP, username, password hash, geo information, and/or other aspects. The rules engine 272 may envelop various ML mechanisms for implementation. Once the features are extracted, the rules engine 272 is then responsible for implementing the clustering mechanism and processes the data for the clusters. In some embodiments, a random forest algorithm may be used to classify transactions to create another set of clusters. The random forest algorithm advantageously may construct a multitude of decision trees at training time, and, for classification tasks, the output of the random forest is the class selected by most trees. The random forest algorithm advantageously corrects for decision trees' habit of over-fitting to their training set. The random forest algorithm is just one classifier that may be used for clustering, and other known classifiers may be applied in different embodiments.

The AT clustering system 270 may, in some embodiments, integrate new clustering algorithms on the fly during runtime to better fit the data that is received. In one embodiment, the ML mechanism may utilize a voting element that is used to determine a particular clustering algorithm that best suits the data to be processed into clusters 230.

A threat insight collector 245 may analyze the clusters 230. When new malicious clusters 230.2 are identified, it may extract additional insights related to the malicious clusters 230.2. The threat insight collector 245 may use rule-based static algorithms for insight extraction. For example, all the successful logins in the new malicious clusters may, after the analysis, be considered suspicious, and repeated source IP addresses in malicious clusters may be used as a new blocklist for a firewall and/or an intrusion prevention system (IPS).

In some embodiments, a clustering orchestrator 255 may be used to manage: 1) data flows between components, such as the AT collector, 260, the AT aggregator 265, and the AT clustering system 270; 2) the data life-cycle; and 3) the re-clustering frequency. The data life-cycle may relate to how much data is retained and for how long. As extended time goes on, the retained data becomes less and less helpful, and the data life-cycle can determine what happens to various types of data after a certain time period has passed. For specific attacks, certain data may be archived or removed after one week to one month, although in other instances, retention of certain data for, e.g., five years may be of some value. In some instances, it may be of value to perform re-clustering of new and/or existing transaction logs to produce additional insights. This is valuable because transactions formerly analyzed as benign (e.g., a user login on a particular system) may subsequently be put into malicious clusters 230.2 after re-clustering (e.g., if it is discovered that there was a data breach in which the user login information was stolen).

Figure 3:
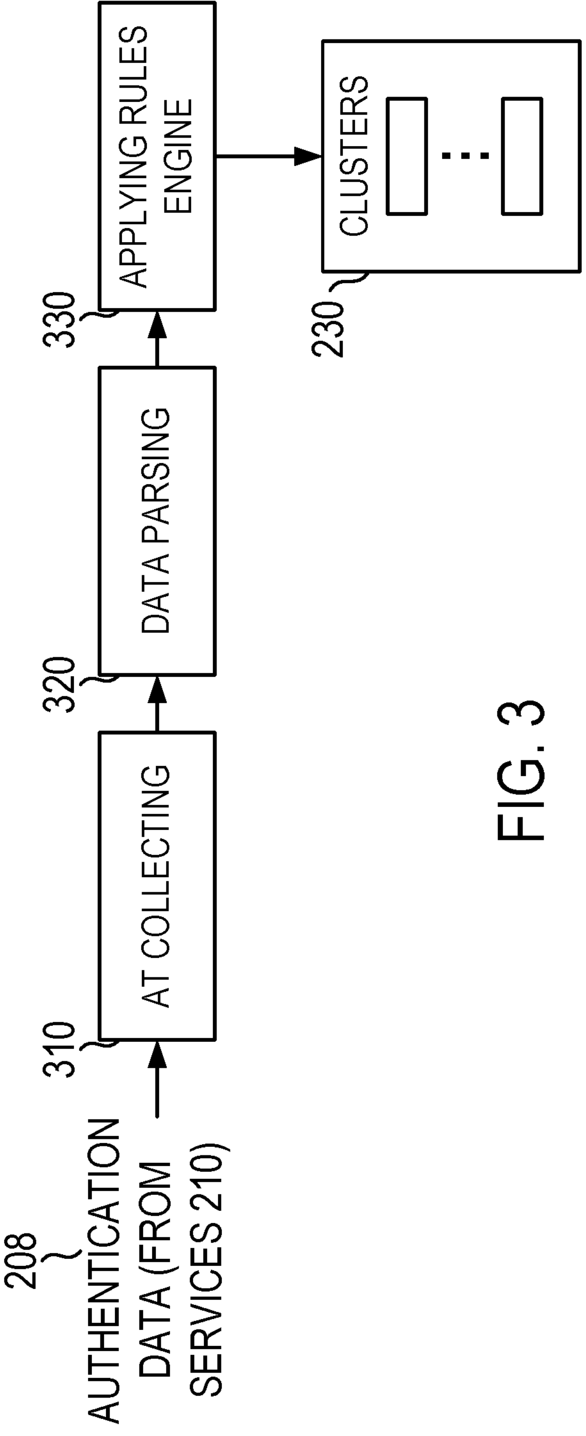
FIG. 3 is a basic flow diagram that illustrates a logical process flow in the system, according to some embodiments.

FIG. 3 is a basic flow diagram that illustrates a logical process flow in the system. The authentication data, which may be in the form of authentication logs 208 is first received from the various services 210 and provided to the AT collecting 310, which may use the AT collector 260 and the AT aggregator 265. The data parsing 320 may provide tagged or otherwise identified/parsed data that may be utilized by the rules engine 272. Here, the parser 262 may take the collected and/or aggregated authentication data and identify various aspects/attributes of the data, which may include any or all of the following (and possibly additional attributes as well): 1) timestamp; 2) time interval; 3) username; 4) password hash; 5) plaintext password; 6) semantic of password: 7) source IP address; 8) destination IP address; 9) IP reputation: ASN, Geo, and categories; and 10) timeseries data, which may include: 10(a) # of login attempts per min; and 10(b) a pattern in login attempts. The parser may make use of any known mechanism for identifying the data, including use of tags, predefined data structures, etc.

The parsed data may be further processed by applying the rules engine (272) 330 that applies the clustering rules and produces the clusters 230. This rule-based clustering may be based on known relationships within the authentication data. Such activities based on the know relationships may include, for example: 1) putting user credentials from the same source IP into the same cluster; 2) putting user credentials targeting the same username into the same cluster; and 3) putting user credentials with the same password (hashed or plain text) into the same cluster.

Figure 4:
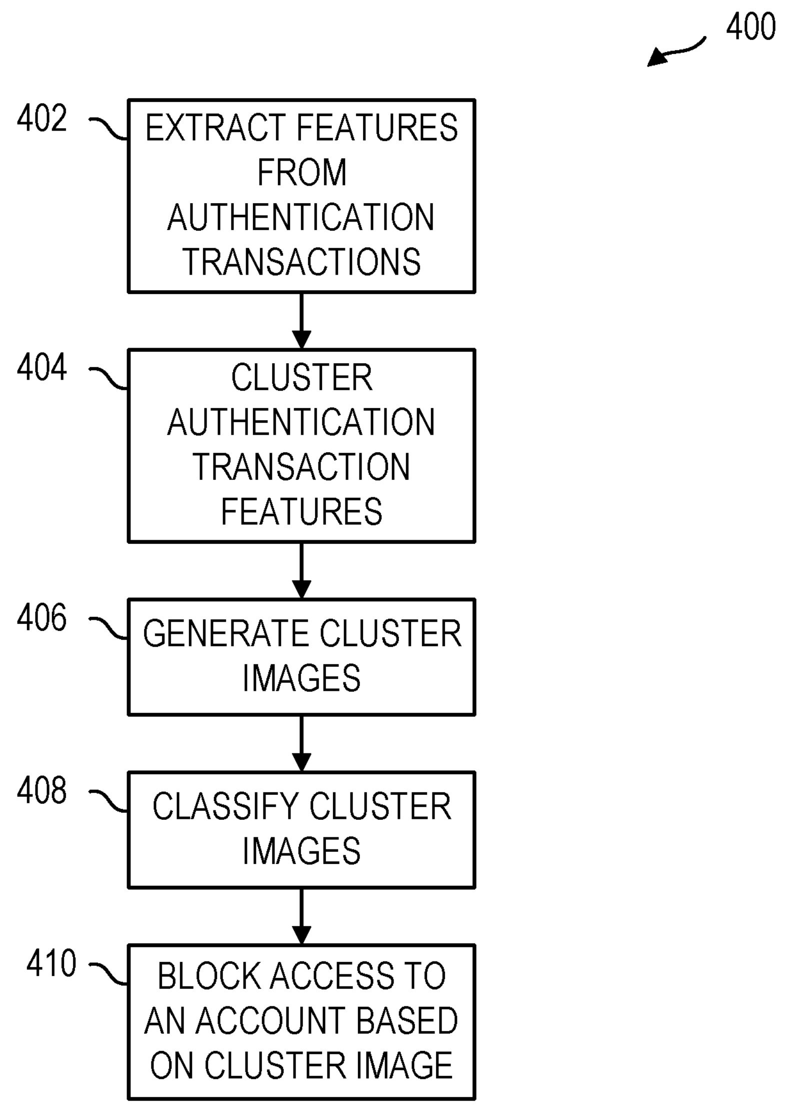
FIG. 4 is a flowchart that illustrates a process for clustering authentication transactions/features, according to some embodiments.

FIG. 4 is a flowchart of an example process 400, for clustering authentication transactions/features, according to some embodiments. In operation 402, authentication transactions are received from a plurality of sources, which may include the authentication service 210.1, the web service 210.2, and the database service 210.3, and other services or applications. Authentication transaction features may then be extracted from the authentication transactions, and aggregated by the AT collector 260, and the AT aggregator 265. In operation 404, the AT clustering system 270 receives the aggregated transaction features and, using the rules engine 272, creates and/or updates transaction clusters 230. In operation 406, the AT clustering system 270 generates cluster images associated with the clusters 230, and in operation 408, the AT clustering system 270 classifies these cluster images. In operation 410, a threat may be blocked (e.g., access to an account may be blocked) based on information in a cluster image that is associated with a threat.

TECHNICAL APPLICATION

The one or more embodiments disclosed herein accordingly provide an improvement to computer technology. For example, an improvement to automatically identifying unauthorized accesses helps to improve the security of a computer against attacks.

What is claimed is:

1. A computer-implemented method for preventing credential attacks, comprising:

receiving information that represents authentication transactions (ATs) comprising authentication transaction features (ATFs);

clustering via analyzing the ATFs via machine learning that includes applying a clustering algorithm to the ATFs such that, in response, clustered ATFs (CATFs) are produced, wherein the clustering comprises assigning user credentials with a same password to a common CATF and the CATFs track sequencing of multiple username-password pairs in a first sequence forming a first list applied as login attempts to a first target computer;

inputting the CATFs into a convolutional neural network such that, in response, the convolutional neural network produces as output a classification that a respective CATF of the CATFs is malicious or non-malicious;

in response to the convolutional neural network recognizing the multiple username-password pairs of the first list being applied in the first sequence as login attempts to a second target computer, classifying a first CATF of the CATFs as malicious and generating a blocklist based on one or more features including the multiple username-password pairs of the first sequence of the first list; and blocking, based on the blocklist, a new activity based on a new sequence matching the first list, wherein the blocking of the new activity comprises blocking access to an account based on attempted logins that include the first sequence of the first list.

2. The method of claim 1, further comprising, using a parser:

extracting the ATFs from the ATs; and labeling the extracted ATFs.

3. The method of claim 1, wherein the one or more features of the first CATF further include a user credential.

4. The method of claim 1, wherein the password is a hashed password.

5. The method of claim 1, further comprising augmenting the CATFs by an external anomaly detection system.

6. The method of claim 1, wherein the ATFs are selected from the group consisting of: 1) timestamp; 2) time interval; 3) username; 4) password hash; 5) plaintext password; 6) semantics of password; 7) source IP address; 8) destination IP address; 9) IP reputation: automatic system lookup (ASN), Geo, and categories; and 10) timeseries data.

7. The method of claim 1, wherein the clustering is an unsupervised clustering and uses the convolutional neural network (CNN) in the producing of the CATFs.

8. The method of claim 1, wherein the ATs are from an authentication service, a web service, and a database service.

9. The method of claim 1, wherein the clustering groups the ATFs by source internet protocol address, username, password, and geo information.

10. The method of claim 1, further comprising classifying, via a random forest algorithm, the CATFs as malicious or non-malicious.

11. The method of claim 2, further comprising aggregating at least one of the ATs and the ATFs to provide further AT context information.

12. The method of claim 6, wherein the ATFs comprise all of: 1) timestamp; 2) time interval; 3) username; 4) password hash; 5) plaintext password; 6) semantics of password; 7) source IP address; 8) destination IP address; 9) IP reputation: automatic system lookup (ASN), Geo, and categories; and 10) timeseries data.

13. The method of claim 6, wherein the timeseries data comprise at least one of a number of login attempts per time period and a pattern in login attempts.

14. An apparatus for preventing credential attacks, comprising:

a memory;

a processor; and program instructions stored in the memory, wherein the program instructions, when executed by the processor, cause the processor to:

receive information that represents authentication transactions (ATs) comprising authentication transaction features (ATFs);

cluster via analyzing the ATFs via machine learning that includes applying a clustering algorithm to the ATFs such that, in response, clustered ATFs (CATFs) are produced, wherein the clustering comprises assigning user credentials with a same password to a common CATF and the CATFs track sequencing of multiple username-password pairs in a first sequence forming a first list applied as login attempts to a first target computer;

inputting the CATFs into a convolutional neural network such that, in response, the convolutional neural network produces as output a classification that a respective CATF of the CATFs is malicious or non-malicious;

in response to the convolutional neural network recognizing the multiple username-password pairs of the first list being applied in the first sequence as login attempts to a second target computer, classifying a first CATF of the CATFs as malicious and generating a blocklist based on one or more features including the multiple username-password pairs of the first sequence of the first list; and blocking, based on the blocklist, a new activity based on a new sequence matching the first list, wherein the blocking of the new activity comprises blocking access to an account based on attempted logins that include the first sequence of the first list.

15. The apparatus of claim 14, wherein the program instructions when executed by the processor further cause the processor to:

extract the ATFs from the ATs via a parser;

label the ATFs via the parser; and aggregate at least one of the ATs and the ATFs to provide further AT context information.

16. The apparatus of claim 14, wherein the one or more features of the first CATF further include a user credential and the password is a hashed password.

17. The apparatus of claim 14, wherein the ATFs are selected from the group consisting of: 1) timestamp; 2) time interval; 3) username; 4) password hash; 5) plaintext password; 6) semantics of password; 7) source IP address; 8) destination IP address; 9) IP reputation: automatic system lookup (ASN), Geo, and categories; and 10) timeseries data.

18. A computer program product for a credential attack prevention apparatus, the computer program product comprising:

one or more computer readable storage media that are non-transitory, and program instructions collectively stored on the one or more computer readable storage media that are non-transitory, the program instructions comprising program instructions to:

receive information that represents authentication transactions (ATs) comprising authentication transaction features (ATFs);

cluster via analyzing the ATFs via machine learning that includes applying a clustering algorithm to the ATFs such that, in response, clustered ATFs (CATFs) are produced, wherein the clustering comprises assigning user credentials with a same password to a common CATF and the CATFs track sequencing of multiple username-password pairs in a first sequence forming a first list applied as login attempts to a first target computer;

inputting the CATFs into a convolutional neural network such that, in response, the convolutional neural network produces as output a classification that a respective CATF of the CATFs is malicious or non-malicious;

in response to the convolutional neural network recognizing the multiple username-password pairs of the first list being applied in the first sequence as login attempts to a second target computer, classifying a first CATF of the CATFs as malicious and generating a blocklist based on one or more features including the multiple username-password pairs of the first sequence of the first list; and blocking, based on the blocklist, a new activity based on a new sequence matching the first list, wherein the blocking of the new activity comprises blocking access to an account based on attempted logins that include the first sequence of the first list.

19. The computer program product of claim 18, wherein the program instructions further comprise program instructions to classify, via a random forest algorithm, the CATFs as malicious or non-malicious.

* * * * *